R. W. ROBINSON.
Churn Dasher.
No. 71,065.
Patented Nov. 19, 1867.
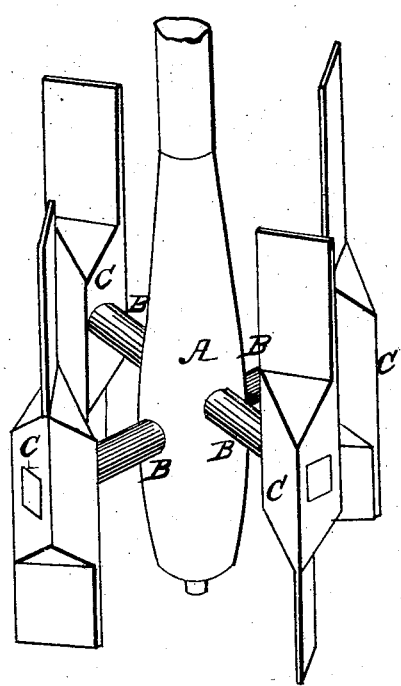

United States Patent Office.

R. W. ROBINSON, OF CLINTON, ILLINOIS, ASSIGNOR TO HIMSELF AND JAMES O'DONALD.

Letters Patent No. 71,065, dated November 19, 1867.

IMPROVEMENT IN CHURN-DASHERS.

The Schedule referred to in these Letters Patent and making part of the same.

TO ALL WHOM IT MAY CONCERN:

Be it known that I, R. W. ROBINSON, of Clinton, in the county of De Witt, and in the State of Illinois, have invented a new and improved Churn-Dasher; and I do hereby declare that the following is a full, clear, and exact description thereof, reference being had to the annexed drawing, making part of this specification, in which by a perspective view my counter-current churn-dash is shown as revolving around a vertical spindle.

The nature of my invention consists in so constructing the floats of a churn-dash, that as it revolves, either vertically or horizontally, the cream shall be drawn in towards the axis for nearly one-half the length of the float, and be forced outwards from the axis by the same portion of the other half length, the comparatively neutral space between the two currents being occupied by the arms of the dash, which in their revolution still further disturb and agitate the cream. It will be evident that the cream which is forced in any one direction, say outward, being one-half or a little less of the whole quantity, must be replaced, and this will be by the other half which has been forced in a contrary direction, and as these two portions are being constantly cut by the arms and floats, the cream is so violently commingled and separated, and sent in rapid and opposing currents from one end of the churn to the other, as will be highly conducive to a rapid production of butter. My improved churn-dash may have a vertical spindle, either stepped or suspended, or it may revolve on a horizontal axis. In either case it may have a continuous or reciprocating motion.

In the drawing, A is the spindle, which may receive its motion by hand or other power, and from which project radially the arms B B. These may vary in number, according to the size of the churn, and the rate of speed at which it is intended to be driven. Four arms are shown in the drawing. To the end of each arm is attached a float, C, parallel with the spindle, having its blades on opposite sides of the arm, in planes at right angles with each other, and intersecting and forming an angle of forty-five degrees with the plane passing through their intersection and the axis of the spindle. A simple way of making the float C would be by cutting away two diagonally opposite corners of a square bar of wood, so as to have two thin blades at right angles with each other, leaving between them sufficient of the square bar to secure the arm B to it so as to be perpendicular to one of its faces. As the floats revolve so that their upper blades shall force the cream outward from the axis of the spindle, the lower blades will draw it in, and if the motion is reversed, so will be the effect on the cream; and as displacement of a portion of the cream ensues by one motion, it will be supplied by the other portion by the contrary movement. The arms B will interrupt the flow from supply to displacement, and, as before stated, enhance the producing power of the dash.

What I claim as new, and desire to secure by Letters Patent, is—

A churn-dasher having floats, with the planes of their blades set parallel with the axis of the spindle A, and obliquely to the planes of a radius passing through their axes, and through the axis of the spindle, substantially as and for the purpose set forth.

In testimony that I claim the above-described improvements in churn-dashers, I have hereunto signed my name this 16th day of August, 1867.

R. W. ROBINSON.

Witnesses:
GEORGE W. PORTER,
JAMES O'DONALD.